Feb. 21, 1950        C. W. APGAR        2,498,061
STOCK TAKE-OFF APPARATUS
Filed Sept. 14, 1944        4 Sheets-Sheet 1
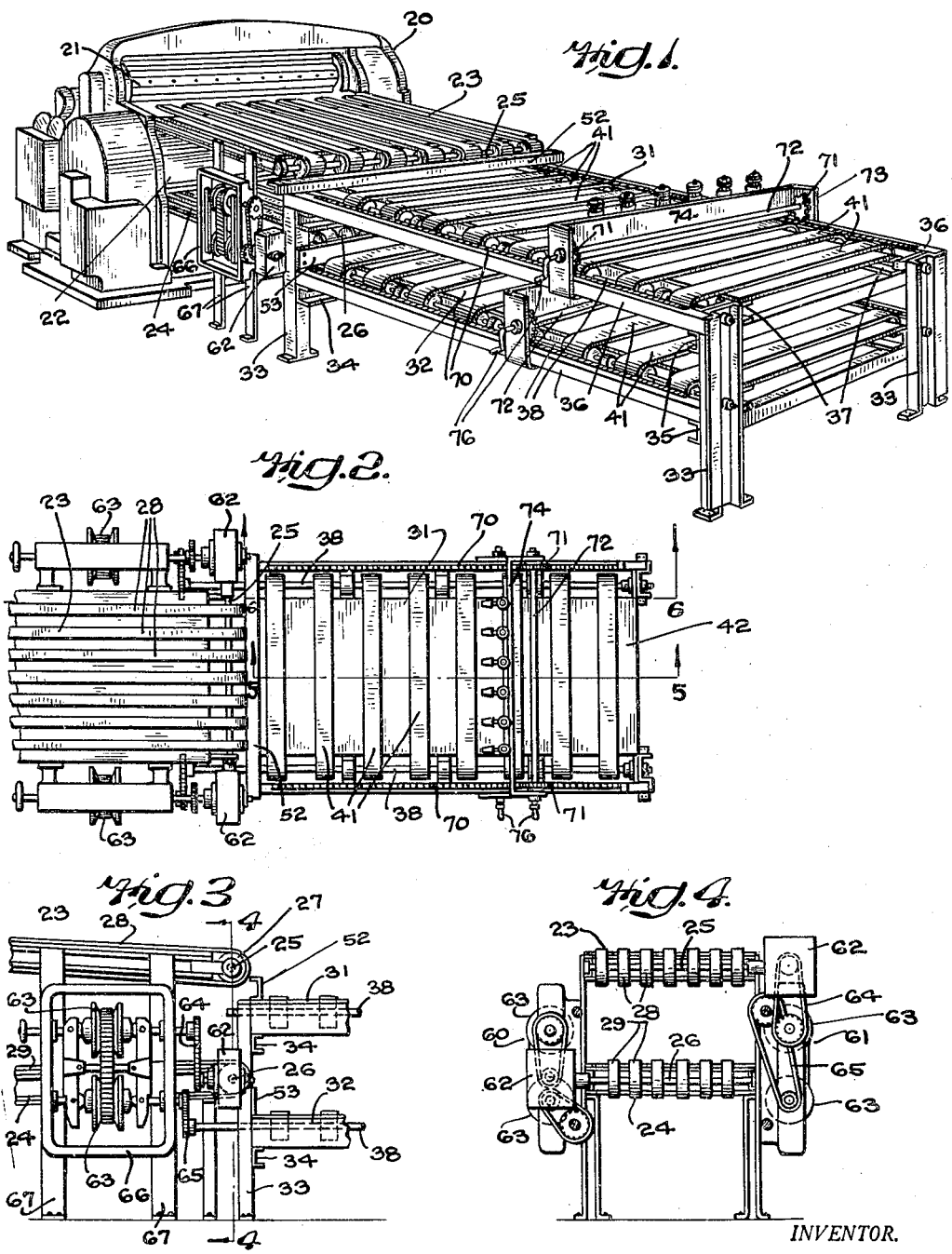
INVENTOR.
CHARLES W. APGAR
BY Lew Edelson
Attorney

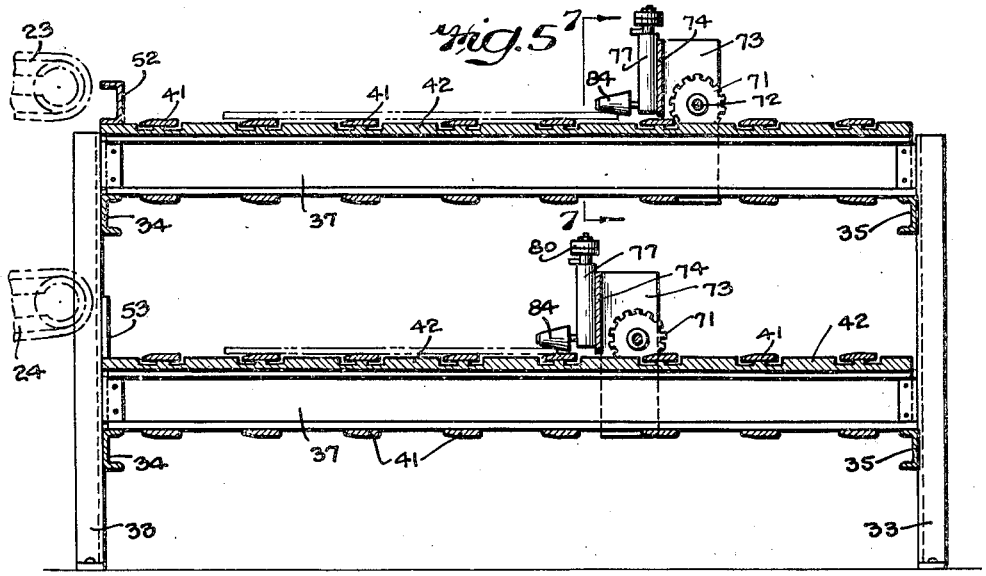
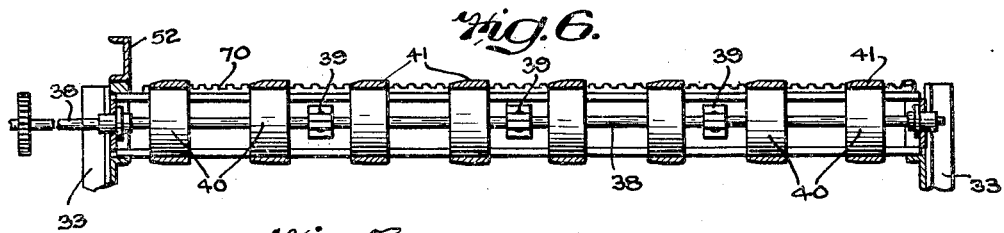
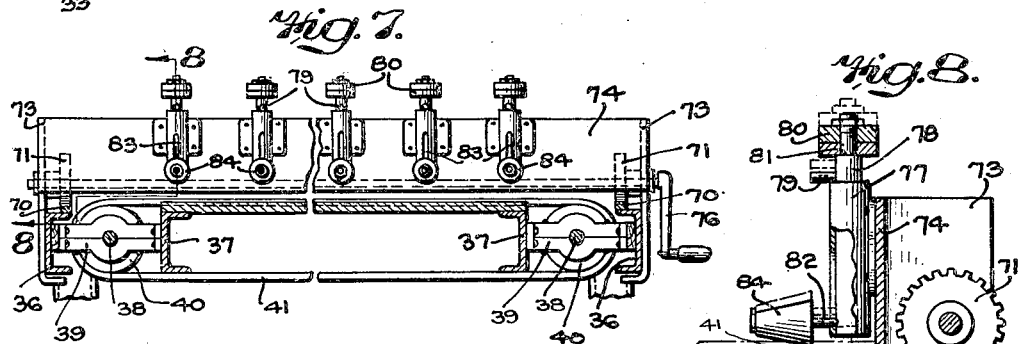
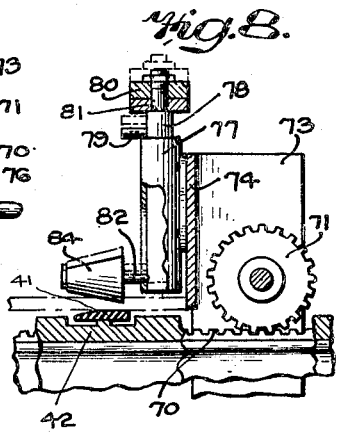
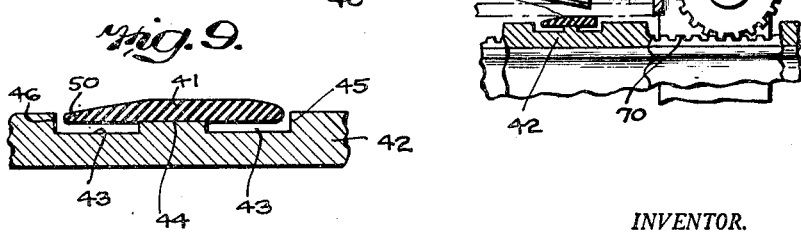
INVENTOR.
CHARLES W. APGAR
BY Leon Edelson
Attorney

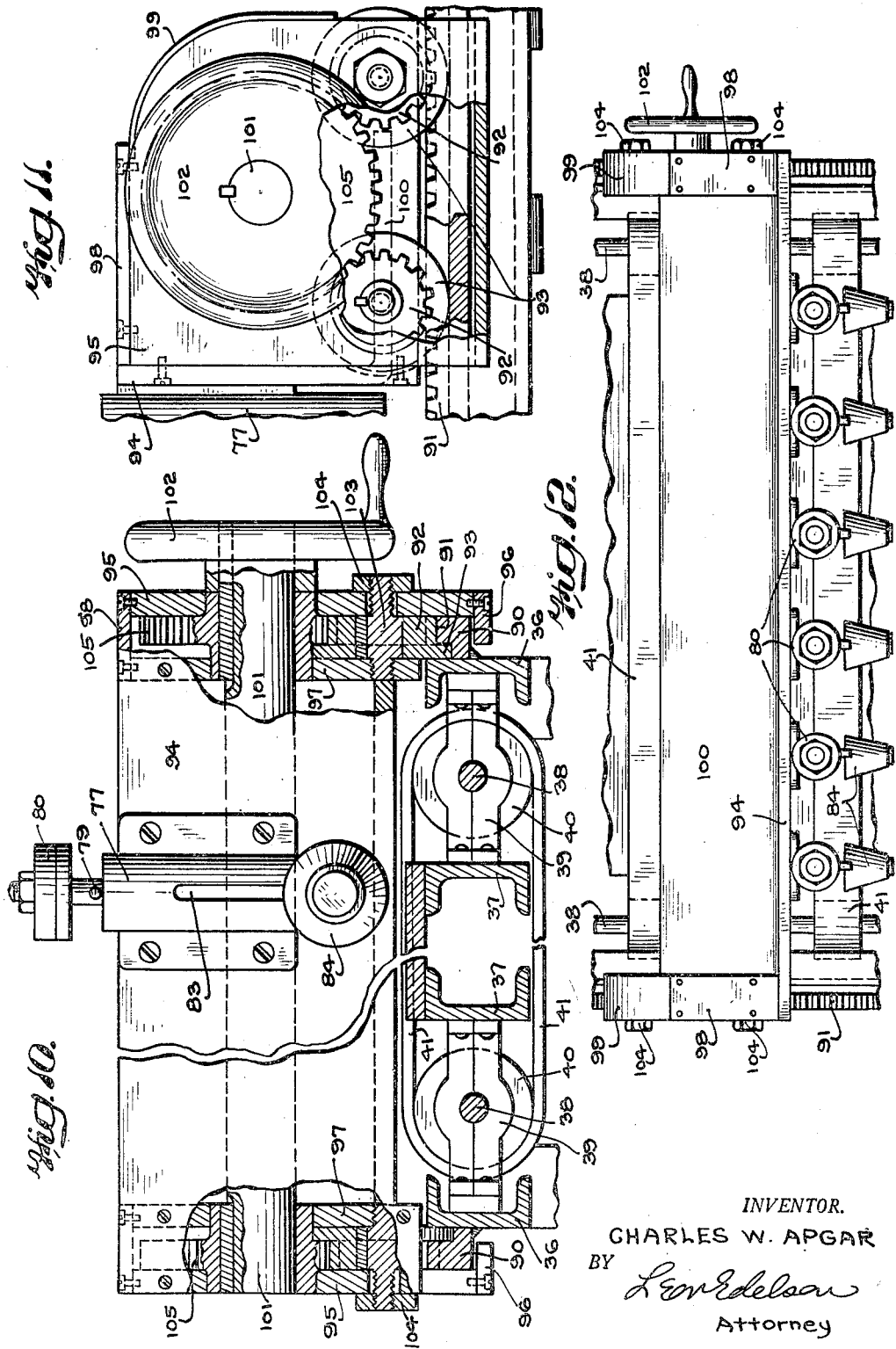

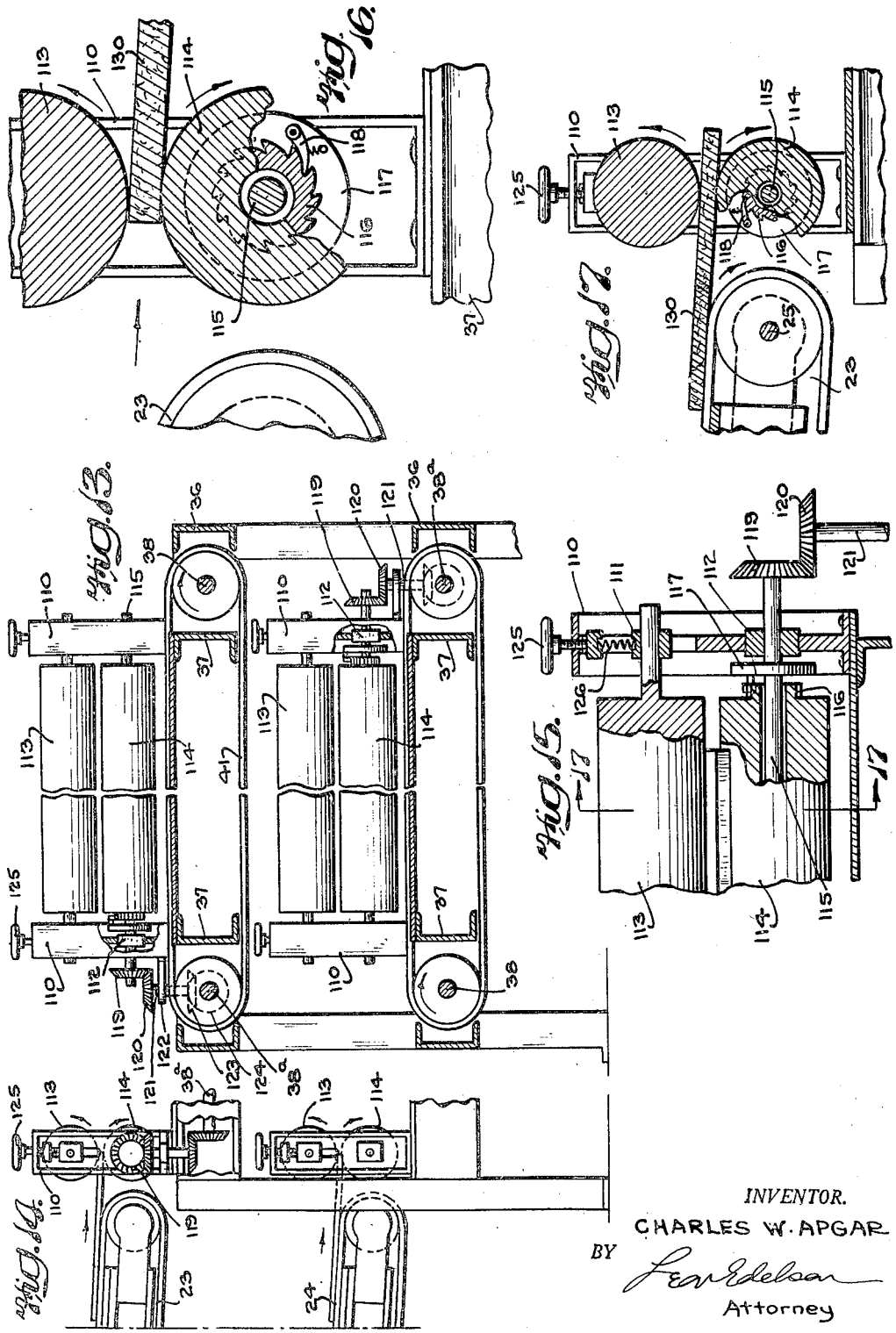

Patented Feb. 21, 1950

2,498,061

UNITED STATES PATENT OFFICE 2,498,061

STOCK TAKE-OFF APPARATUS

Charles W. Apgar, Philadelphia, Pa., assignor, by mesne assignments, to Abraham L. Rosenfeld, Charles W. Apgar, and Fredric R. Mann, Philadelphia, Pa., as trustees Application September 14, 1944, Serial No. 554,092

14 Claims. (Cl. 271—76)

The present invention relates generally to the handling of sheet material of the type which is manufactured in the form of a continuous web adapted to be cut or severed into sheets of relatively large size, and more particularly to an apparatus which is particularly adapted to facilitate the delivery, distribution and stacking of such sheets with a minimum of manual handling thereof.

The present invention particularly comprises a stock take-off apparatus designed for operative association with the apparatus on which the stock to be handled is manufactured, it being understood that while the apparatus disclosed herein is employed particularly for the handling of such sheet material as corrugated paper board or the like, it is also applicable for use in the handling of other relatively stiff sheet materials.

In the manufacture of corrugated paper board, which includes corrugating webs of material and associating such corrugated webs with uncorrugated webs as by pasting to provide a laminated board, such operations are often conducted in a dual-level apparatus. That is, a single machine performs all the necessary operations at each of two superposed levels. Thus, where the continuous webs are to be cut into sheets of predetermined size, this dual type of apparatus includes for each operating level thereof a pair of rotary cutters, one pair disposed vertically above the other, whereby the cutting units operate upon two continuously travelling webs of the fabricated material to cut them into sheets of predetermined size for simultaneous discharge at the two different levels.

It is the aim of the present machine to provide a stock take-off apparatus which automatically receives the cut sheets delivered from the discharge conveyors of the main apparatus, changes the direction of travel of said sheets and delivers the sheets from each different level to a station where they may be conveniently handled and stacked.

In order to deflect the sheets from their course of travel, it is necessary to stop the sheets in their course and then automatically shift them laterally of their original course of travel, and to this end the present invention has as its object the provision of means for effecting the aforesaid operations expeditiously and without marring or defacing the sheets or the edges of the sheets.

Other objects of the invention are to provide a simple rugged stock take-off or distributing apparatus which may be readily installed and combined with conventional apparatus for fabricating corrugated board and the like.

With the above objects in view, the invention further resides in the combination and arrangement of parts and in the details of construction herein described and claimed; it being understood that the specific embodiments of the invention described herein are illustrative and that modifications thereof falling within the scope of the appended claims will be apparent to persons skilled in the art.

In the accompanying drawings:

Figure 1 is a perspective view of one embodiment of the present invention showing the stock delivery apparatus of the present invention operatively associated with the sheet cutting unit of an apparatus for fabricating corrugated board;

Figure 2 is a top plan view of the delivery apparatus in conjunction with the adjacent end portion of the conveyor from the sheet cutting unit;

Figure 3 is a side view showing the power transfer mechanism from the main apparatus to the delivery or stock take-off apparatus of the present invention;

Figure 4 is an end view taken substantially along the line 4—4 of Figure 3;

Figure 5 is a sectional view of the stock take-off apparatus on line 5—5 of Figure 2;

Figure 6 is a sectional view of the upper level of the stock take-off apparatus taken on line 6—6 of Figure 2;

Figure 7 is a sectional view taken on line 7—7 of Figure 5;

Figure 8 is a sectional view taken on line 8—8 of Figure 7;

Figure 9 is a sectional view showing a detail of the arrangement of the travelling belts and supporting table of the stock take-off apparatus;

Figure 10 is a part sectional view of a modified form of the stock take-off apparatus;

Figure 11 is a partly broken end view of Figure 10;

Figure 12 is a plan view of the modified form of construction shown in Figure 10;

Figure 13 is a part sectional end view of another modified form of the stock take-off apparatus of the present invention;

Figure 14 is a partly broken side view of the apparatus shown in Figure 13;

Figure 15 is an enlarged end view of a detail shown in Figure 13;

Figure 16 is a detail showing of the rolls and overdrive employed in the modification shown in Figure 13; and Figure 17 is a sectional view taken on line 17—17 of Figure 15.

The present invention is designed for use in combination with the conventional apparatus for manufacturing corrugated paper board, which manufacture generally includes the feeding of continuous webs of sheet material, such as paper or cardboard, through various calendering and other sheet processing units arranged in line, to produce the finished product well known in the art. The final operation in such manufacture is to cut the fabricated web into sheets of predetermined size, this being effected by means of sheet cutting units, which usually consist of a pair of rotary cutter rolls arranged almost at the end of the line of the processing units, or it may be to slot and score or impress printed matter upon the pre-cut sheets. Upon completion of any of these operations, the sheets are discharged from the main apparatus by conveyor belts which conventionally deliver them to a point where the sheets may be taken up for disposition as desired. In order to save space and increase production, the processing of the corrugated board is generally effected at two levels, all of the operations for each web being performed in each of the two levels. In such case, each level of the machine is provided with its own sheet cutting unit by means of which the fabricated web is severed into sheets of predetermined length. For the purposes of the present invention it is deemed unnecessary to illustrate the entire apparatus and consequently only the cutting unit thereof, designated by the reference numeral 20, is shown, it being understood that for the purposes of the present invention such cutting unit may also represent the entire machine employed in the manufacture of sheeted material such as corrugated paper board or other sheet material which is ultimately cut to sheets of desired size, or it may be replaced by some other type of unit, as for example, a sheet printing unit or a slotting and scoring unit.

While it is not necessary to describe the cutting unit 20 in detail, reference is made to the dual pairs 21 and 22 of the rotary cutters respectively disposed at different levels, and to the discharge conveyors 23 and 24 which support the free end of the continuous web while it is being severed and convey the severed sheets away from the cutter rolls. The conveyors 23 and 24 each have a forward shaft 25 and 26, respectively, each shaft also carrying a series of pulleys 27 about which are fitted the endless belts 28 of the upper lever conveyor and the endless belts 29 of the lower lever conveyor. The shafts 25 and 26 receive power respectively from the belts 28 and 29 which are driven in synchronism with the cutting rolls of the machine and by means which do not form part of the present invention. It will be understood that each pair of the rotary cutters is provided with means well known in the art for adjusting the rate of rotation thereof for the purpose of varying the length of the sheet which is severed from the end of the continuous web.

In the apparatus thus far described it was customary prior to the present invention to permit the cut sheets delivered from the cutter rolls by the belts 28 and 29 to be deposited on the floor or on receiving tables disposed immediately in front of the stock discharge conveyors 23 and 24. Such an arrangement rendered the handling and stacking of the cut sheets difficult. To obviate this difficulty, the present invention provides an apparatus cooperating with the conveyors 23 and 24 which is adapted to receive the sheets and deliver them substantially at right angles to the direction of their discharge from the said conveyors 23 and 24. Thus, in the machine shown in Figure 1, the sheets delivered from the upper level are shifted to the right while the sheets delivered from the lower level of the cutter are shifted to the left. At these points tables or any other devices, which it is not necessary to describe in further detail, may be disposed for reception and stacking of the sheets which are laterally discharged from the auxiliary stock take-off conveyors, designated generally by the reference numerals 31 and 32.

The upper stock take-off conveyor 31, designed to cooperate with the delivery conveyor 23 of the main apparatus, will be seen to be disposed at a level somewhat below the forward end of the conveyor 23. Similarly, the lower stock take-off conveyor 32 will be seen to be disposed at a level below the forward end of the lower main delivery conveyor 24. The stock take-off conveyors 31 and 32 are each mounted upon frames supported by the legs 33. Inasmuch as both of the conveyors 31 and 32 are substantially identical in construction, only the upper conveyor will be described in detail.

The horizontally disposed frame of the upper conveyor 31 includes a forward bar or channel member 34 fixed to the forward pair of legs 33, a rear bar or channel member 35 fixed to the rear pair of legs 33, and longitudinal side channel members 36—36 secured at their opposite ends to the transverse members 34 and 35. Another pair of longitudinal channel members 37—37 are disposed between the channel members 36—36 and are also fixed at their ends to the cross bars or members 34 and 35. A pair of shafts 38 are respectively disposed longitudinally between each adjoining the pair of longitudinally extending channel members 36 and 37, the opposite ends of these shafts 38 being extended through the legs 33. Several sets of bearing blocks 39, fitted between the members 36 and 37, support the shafts 38 for rotation, as shown in Figure 7 of the drawings, while a series of longitudinally spaced pulleys 40 are carried by each of the shafts 38.

The channel members 37—37 support on their upper surfaces a table 42 which may be made of any suitable material but is preferably made of wood and is particularly designed for supporting the uppermost lengths of the endless conveyor belts 41 which are fitted about and actuated by the pulleys 40. In order to accommodate these uppermost lengths of the conveyor belts 41, the table 42 is provided with a series of transverse grooves 43, these latter being preferably disposed in adjacent pairs with a parting strip 44 between them having its upper surface at a level somewhat below the upper face of the table. By means of this arrangement, the upper course of each belt 41 is supported by the upper face of the strip 44 between the two grooves 43 with the side walls 45 and 46 of these grooves 43 serving as guides for the longitudinal edges of the belt. Thus, by this arrangement, the friction between the belts and the table is minimized, for the major portion of the underface of the belt lies over the grooves 43, at the same time that the width of the strip 44 between the grooves 43 supplies adequate support for the belt as it is guided in its travel between the lateral edges of the grooves 43.

The endless belts 41 may be made of any suitable material, such as the ordinary belt fabric, and as shown in the enlarged view in Figure 9, each such belt is provided with a forward tapering edge 50 which merges into a horizontal plane substantially flush with that of the upper surface of the stationary table 42. It will be seen that at its forward edge the belt offers no obstruction to the travel of sheets across the belt, while at the same time the upwardly sloping portion permits the sheet to ride up on the belt and be supported on the top thereof and out of contact with the upper surface of the stationary table 42, as shown by the dotted line representation of the sheet in Figure 5. Comparing the view shown in Figure 9 with that shown in Figure 5, it will be seen that the edge 50 faces the sheets as they come off the cutting tables. This construction, therefore, minimizes resistance to the forward travel of the sheets on to the delivery table.

The upper stock take-off conveyor 31 has been previously described as being disposed at a level substantially below the forward edge of the main delivery conveyor 23. This space is preferably bridged by the cross bar 52, which serves as an intermediate support for the sheet as it is being transferred from the conveyor 23 to the take-off conveyor 31. Similarly, the frame of the lower conveyor 32 is provided with a forward cross bar 53 which serves the same purpose.

The conveyor belts 41 of the upper take-off conveyor 31 all travel, of course, in the same direction so as to deliver the sheets to one side of the stock take-off apparatus, while the conveyor belts 41 of the lower conveyor 32 all travel in the opposite direction so as to deliver the sheets to the opposite side of the apparatus. Power for driving these conveyor belts may be derived from any desired source. It is preferred, however, in the present invention that instead of providing an independent source of power for these conveyor belts, the power be derived from the apparatus with which it is associated. In the preferred form, therefore, of the present invention this power is taken off from the conveyors 23 and 24 leading away from the cutter rolls of the main apparatus. As shown, two separate power take-off devices are provided one for each of the stock take-off conveyor units. Preferably, the power take-off device is interposed between the upper discharge conveyor of the main apparatus and the corresponding stock take-off conveyor of the auxiliary apparatus, while a similar power take-off device is interposed between the adjoining lower conveyors of the main and auxiliary apparatus. It will be understood, however, that if desired one power take-off from one of the main conveyors or from any other source may supply power to both the upper and lower auxiliary conveyors.

The power take-off devices are shown most clearly in Figures 1, 2, 3 and 4. Referring more particularly to Figure 4, it will be seen that the power take-off device 60 takes power from the driven shaft 26 of the lower main conveyor 24 and delivers power to a shaft 38 of the lower auxiliary conveyor 32. Similarly, the power take-off 61 takes power from the driven shaft 25 of the upper main conveyor 23 and delivers power to a shaft 38 of the upper auxiliary conveyor 31. Each power take-off device includes a gear reduction box 62, one end of which is coupled directly to one of the driven shafts of the main conveyors (i. e. to shafts 25 and 26, respectively) and the opposite end of which is connected to a variable drive mechanism of the well-known Reeves type having a pair of variable drive pulleys 63—63. The power from the gear box 62 is delivered by means of sprocket chain 64 to the upper pulley 63 of the variable drive, while the lower pulley of said drive delivers power to the corresponding shaft 38 of the auxiliary conveyor by means of the sprocket chain 65. The Reeves pulley unit is carried by the frame 66 which is mounted upon a pair of supporting legs 67, the latter being firmly fixed to the frame elements of the main apparatus. It will be understood that any other type of drive mechanism may be employed for the purpose.

By reason of the fact that the auxiliary stock take-off conveyors are operatively associated with and driven in timed relation to the main delivery conveyors through the intervention of the variable drive mechanisms, it will be apparent that by adjustment of these mechanisms the speed of operation of the discharge conveyors of the lateral take-offs may be increased or decreased as desired to change the degree of overlap of the sheets successively delivered from the main discharge conveyors to the auxiliary lateral discharge conveyors.

Because of this variable drive connection between each main delivery conveyor and its associated lateral take-off conveyor, it becomes a simple matter to adjust the apparatus as a whole for most efficient and satisfactory handling of sheets without changing the delivery speed of the main apparatus. Thus, where for a given delivery speed of the main conveyor 23 (or 24) sheets are being discharged laterally from the take-off apparatus with too small an overlap or "fanning" between successive sheets, by the simple expedient of adjusting the variable drive to provide for a reduced speed of operation of the lateral discharge conveyor the sheets successively received by the latter will move therefrom laterally with increased overlap therebetween. Thus, efficient and uniform stacking of the sheets upon the lateral discharge conveyor with any desired degree of overlap therebetween is readily obtainable.

It will now be understood that as the machine operates to produce two continuous webs of corrugated paper board, the webs are continuously delivered to the two cutting units 21 and 22 which cut the web into sheets of predetermined size and deliver such cut sheets on to the main discharge conveyors 23 and 24, which latter include the endless conveyor belts 28 and 29. These conveyor belts 28 and 29 are an essential part of the entire manufacturing apparatus and serve to discharge the finished product in the form of sheets cut to size at a rate for which the machine is designed to operate, the direction of travel of the said discharge conveyor belts 28 and 29 being at an angle to the direction of travel of the belts 41 of the auxiliary stock take-off conveyors 31 and 32. Preferably, the angular relation between the directions of travel of the main and auxiliary conveyor belts is right angular as shown, with the travel of the belts of the upper auxiliary conveyor 31 opposite in direction to that of the belts of the lower auxiliary conveyor 32. While the travel of the auxiliary conveyor belts is thus transverse to the forward movement of the sheets delivered from the main conveyors, such lateral operation of the auxiliary conveyors is not in itself sufficient to arrest the forward motions of the sheets as they are projected from the main conveyors.

The present invention, therefore, provides means for arresting such forward motion of the sheets as the same are deposited on the auxiliary conveyors by the forward motion of the discharge conveyors of the main apparatus. These motion arresting or stop means for the sheets also function to positionally adjust the sheets on the auxiliary stock take-off conveyors so that the same may be properly delivered on to a receiving table not shown in the drawings. Because of the size of the sheet delivered by the manufacturing and cutting machine may vary over a considerable range, the present invention provides for the longitudinal adjustment of the said arresting means.

The longitudinal channel members 36—36 of the supporting frame for the auxiliary conveyor each have fixed to their upper edges a toothed rack bar 70 (see Figures 1, 2, 6, 7 and 8). These are engaged by a pair of pinions 71 which are respectively secured to the opposite ends of a common shaft 72. The shaft 72 is supported for rotation by a pair of rearwardly turned, parallel flanges formed as integral wings of a transversely extending back stop member 74, the said flanges 73 being extended downwardly and thence inwardly to engage the bottoms of the channel 36—36. The shaft 72 is provided with a handle 76 at one side or the other of the auxiliary conveyor apparatus, it being apparent that upon rotation of said handle, the pinions 71—71 will be caused to travel longitudinally in either direction along the racks 70—70 and so carry with them the back stop member 74, thereby positionally adjusting the latter to vary, as desired, the effective width of the auxiliary conveyor.

As most clearly appears in Figures 5, 7 and 8, the back stop 74 is provided with several devices which serve to engage resiliently the forward edge of each sheet as it is delivered and deposited on the auxiliary conveyor 31 (and 32). As shown in the drawings, these devices of suitable number uniformly spaced transversely of the original direction of travel of the sheet, each comprises an open-ended sleeve 77, a stud or rod 78 slidably and snugly fitting in the sleeve 77, said rod having a transverse stop pin 79 at the upper end thereof, and weights 80 carried at the top on its shouldered portion 81. At its lower end the rod 78 is fitted with a pin 82, arranged to travel in the slot 83 of the sleeve, said pin having rotatably journalled thereon a frusto-conical element 84.

In the absence of any sheet being interposed between the rotatable conical elements 84 and the take-off conveyor, the said elements will be in position shown in full lines in Figure 8. As a sheet is projected forwardly from the main apparatus, the forward edge of the sheet engages the bottom surfaces of the conical elements, the ensuing wedging action tending to push the weighted rods 78 upwardly so that they assume the position indicated in dotted lines in Figure 8. This serves to absorb the energy of the forward motion of the sheet with the consequence that while the forward edge of the sheet closely approaches the back-stop 74, as shown in dotted lines in Figure 8, the sheet has substantially lost its momentum with the result that rebound of the sheet is prevented, the sheet being thus properly positioned for lateral discharge from the auxiliary conveyor. Also, these elements 84 serve to prevent injury to the edge of the sheet such as might result due to forceful striking thereof against the back-stop 74.

Figures 10, 11 and 12 relate to the same organization as that shown in Figure 1, but show a modified structure for supporting and adjusting the motion absorbing or arresting mechanism. It will be observed that these figures only show a small part of one of the auxiliary stock take-off conveyors. Thus, Figure 10 shows the longitudinal frame members 36—36 and the parallel platform supporting bars 37—37, as well as the bearings 39 for supporting the shafts 38—38. Each shaft 38 is shown as fitted with the pulleys 40 carrying the conveyor belts 41 as in the modification shown in Figure 1. The longitudinal frame members 36—36 support the motion absorbing mechanism and permit the longitudinal adjustment of this mechanism for different size sheets. In this modified construction, L-shaped bars 90 are welded to the outer faces of the longitudinal frame members 36—36, the upper face of the vertical leg of each bar 90 being toothed to form a rack 91 for engagement with a pair of pinions 92. Each of the pinions 92 has an annular flange 93 which projects into the space between the rack 91 and the outer face of the supporting longitudinal channel 36, thereby providing a firm support and guide for the structure which travels on the rack 91.

The motion absorbing or bumper apparatus includes a transverse back plate 94 upon the front face of which is secured a plurality of laterally spaced devices similar to that shown in Figure 8. At each end of plate 94 is mounted a side plate 95, the side plate 95 extending downward to approximately the lower face of the L-shaped bar 90. To the bottom edge of each side plate 95 is attached a confining strip 96 which extends under the bar 90, the latter being thereby enclosed between the strip 96 and the pinions 92. On the inner side of and spaced from each side plate 95 is mounted a second plate 97 which together with the outer plate 95 forms a chamber, the top of which is bridged by a plate 98, while curved sheet metal elements 99 serve to close the rear of the chamber. Preferably, in order to strengthen and rigidify the back stop plate 94, the latter is provided at its lower edge with an integrally formed rearwardly turned flange 100. A shaft 101 extends through from one side plate 95 to the other side plate 95 and extends outwardly through one of the side plates and carries a hand wheel 102. Each pair of the pinions 92, which are in meshed engagement with the rack 91, are freely rotatable on stub shafts 103, the inner ends of which are threaded into each of the inner side plates 97 while the outer ends of said shafts project through the adjacent outer side plate 95 and are locked thereto by the nuts 104. A larger gear 105 is splined to each end of the shaft 101 by a key 106, each of these gears 105 being in constant mesh with each pair of the pinions 92. By means of this arrangement as just described, rotation of the handle 102 will effect corresponding rotation of the gears 105 and their associated pinions 92 with consequent positional adjustment, as desired, of the back stop 94 lengthwise of the auxiliary stock take-off conveyors. Moreover, this arrangement precludes any tendency for the back stop to assume any but a right angular position with respect to the direction of travel of the sheets as delivered from the discharge conveyors of the main apparatus.

In the apparatus thus far described, the sheets as discharged from the cutting rolls of the main apparatus are deposited on to the auxiliary conveyors at a speed approximately equal to that of their discharge speed from the main conveyors, and it is because of this that the motion absorbing or arresting mechanism was necessary. It should be noted that these mechanisms, employing the weighted bumper cones 84, serve not only to absorb the motion of the sheet but also to grip the sheet and prevent it from rebounding, while at the same time permitting the sheets to be shifted laterally by reason of the fact that the cones 84 are freely rotatable upon their supporting pins 82.

The apparatus shown in Figures 13 to 17, inclusive, provides means for delivering and depositing each sheet to the delivery table at a much reduced speed or at such a speed that it will not tend to slide forwardly, but instead will immediately be carried to the right or to the left by the stock take-off conveyors. Thus modification, therefore, eliminates the use of the back stops in the forms shown in the first three sheets of the drawings. Instead, in the modified arrangement shown in said Figures 13 to 17, means are provided immediately adjacent the main discharge conveyors which accepts the cut sheet, permits the same to move at the rate at which the main conveyor operates, and then reduces the speed of travel of the sheet immediately as it leaves the main conveyor and before it is deposited on the auxiliary conveyor.

More specifically, this last modification provides a pair of rollers mounted at the discharge end of each main conveyor and connected to be driven, through the intervention of any suitable overdrive device, by one of the shafts 38, preferably by the shaft 38ª which is opposite to the one directly connected to and driven by the Reeves drive. The Reeves drive which transmits power from the discharge conveyors of the main apparatus to the auxiliary stock take-off conveyors substantially reduces the speed of operation of the latter. This results in some overlapping of the sheets as the same are delivered on to the auxiliary conveyors, thereby facilitating the stacking of the sheets. The rolls which accept the sheet from each main discharge conveyor are, therefore, driven by the sheet at a relatively high speed which is substantially the speed of the said main conveyor. As soon, however, as the sheet becomes free of the main conveyor, the speed of rotation of the rollers becomes greatly reduced with corresponding reduction in the speed of travel of the sheet. The result is that when the sheet is dropped onto the delivery table by the rollers the sheet has substantially no momentum.

Referring now to the specific disclosure of the present modification, a pair of laterally spaced vertical supports 110—110 are suitably mounted upon the forward end of the supporting frame for the auxiliary stock take-off conveyors, each such support being fitted with a pair of superposed bearing blocks 111—112. An upper roller 113 is freely journalled within the bearing blocks 111—111, while a lower roller 114 is mounted for free rotation about a shaft 115 journalled within the bearing blocks 112—112. One end of the roller 114 is provided with an integral ratchet 116. A disk 117 keyed to the shaft 115 carries a spring-pressed pawl 118 which is in driving engagement with the teeth of the ratchet 116. The shaft 115 has a beveled gear 119 at its end in engagement with a beveled gear 120 carried by the stub shaft 121 which is journalled in the plate 122 fixed to the vertical support 110. The lower end of the stub shaft 121 is geared to the shaft 38ª by means of beveled gears 123 and 124 shown in dotted lines in Figure 13. The pressure of the roller 113 on the stock passing between the rollers 113 and 114 may be adjusted by means of the handles 125—125 and springs 126—126 which bear respectively against the bearing blocks 111—111.

It will be understood from the foregoing that in the absence of any other driving power the shaft 38ª will transmit power to the roller 114 by means of the gears 125, 123, 120 and 119 and thence by means of the pawl and ratchet 118 and 117.

When a sheet, such as sheet 130 (Figure 17), is being delivered by the main discharge conveyor 23, the speed of the sheet 130 will cause the rollers 113 and 114 to move at a relatively high speed, namely, at the speed at which the sheet is being delivered. The pawl and ratchet overdrive permits the rollers 113 and 114 to operate at this high speed. As soon, however, as the sheet 130 is free of the conveyor 23 (Figure 16), the speed of the rollers 113 and 114 is immediately dropped to the speed delivered by the shaft 38ª, which serves to check the speed of the sheet 130 so that when it is delivered by the rollers 113 and 114 to the auxiliary stock take-off conveyor 31, it has substantially no momentum.

It will be understood, of course, that the mechanism provided for reducing the speed of travel of the sheet as it leaves the lower level main discharge conveyor 24 and so checking its momentum preliminarily to depositing it on to the lower level auxiliary take-off conveyor 32 is similar to that just described and therefore need not be described in detail.

Also, it is to be understood that in certain installations of the auxiliary stock take-off apparatus it may be desirable and more convenient to effect the lateral discharge of the stock from corresponding sides of the upper and lower levels of said apparatus, but at points spaced longitudinally in advance of the discharge conveyors of the main apparatus. To this end, the said stock discharge conveyors of the main apparatus may be of different overall lengths, the lower level discharge conveyor preferably extending to a greater distance forwardly than does the upper lever discharge conveyor. Each of these conveyors is then provided with its operatively associated stock take-off conveyor as hereinbefore described, these take-off conveyors being relatively displaced to an extent corresponding to the relative displacement of the outer ends of the main conveyors and the belts 41 thereof operating all in the same direction to effect delivery of the stock from the same sides of both of the stock take-off conveyors.

It will be apparent, of course, that the several arrangements hereinbefore described are subject to various other changes and modifications without departing from the general principles or real spirit of the present invention, and the said invention is accordingly intended to be claimed broadly as well as specifically as indicated by the appended claims.

What is claimed as new and useful is:

1. In an apparatus for handling and distributing stock delivered in sheet form from a main fabricating apparatus having a pair of stock discharge conveyors, a pair of stock take-off conveyors disposed in vertically spaced relation and respectively adapted to receive stock discharge from said stock discharge conveyors, said take-off conveyors being each operable to deliver the stock in a direction angularly related to the direction of its discharge from the stock discharge conveyors, and drive means interposed between said stock discharge conveyors and said stock take-off conveyors for operating the latter in opposite directions relatively to each other.

2. In an apparatus for handling and distributing stock delivered in sheet form from a main fabricating apparatus having a pair of stock discharge conveyors, a pair of stock take-off conveyors disposed in vertically spaced relation and respectively adapted to receive stock discharged from said stock discharge conveyors, said take-off conveyors being each operable to deliver the stock in a direction angularly related to the direction of its discharge from the stock discharge conveyors, and drive means interposed between said stock discharge conveyors and said stock take-off conveyors for operating the latter in opposite directions relatively to each other, said drive means deriving its power from said stock discharge conveyors.

3. In an apparatus for handling and distributing stock delivered in sheet form from a main fabricating apparatus having a pair of stock discharge conveyors, a pair of stock take-off conveyors respectively associated with each of said discharge conveyors, and variable drive means for transmitting power from said stock discharge conveyors respectively to said stock take-off conveyors, said drive means being operable to vary the operative speed of said take-off conveyors relatively to that of said discharge conveyors, the take-off conveyors being operable in opposite directions and angularly with respect to the direction of operation of the said discharge conveyors.

4. In an apparatus for handling and distributing stock delivered in sheet form from a main fabricating apparatus having a pair of stock discharge conveyors, a pair of stock take-off conveyors respectively associated with each of said discharge conveyors, and variable drive means for transmitting power from said stock discharge conveyors respectively to said stock take-off conveyors, said drive means being operable to vary the operative speed of said take-off conveyors relatively to that of said discharge conveyors, the take-off conveyors being operable in directions angularly with respect to the direction of operation of the said discharge conveyors, each of said stock take-off conveyors having operatively associated therewith means for arresting the forward motion of the stock received on said conveyors.

5. In an apparatus for handling and distributing stock delivered in sheet form from a main fabricating apparatus having a pair of stock discharge conveyors, a pair of stock take-off conveyors respectively associated with each of said discharge conveyors, variable drive means for transmitting power from said stock discharge conveyors respectively to said stock take-off conveyors, said drive means being operable to vary the operative speed of said take-off conveyors relatively to that of said discharge conveyors, the take-off conveyors being operable in opposite directions and angularly with respect to the direction of operation of the said discharge conveyors, each of said stock take-off conveyors having operatively associated therewith means for resiliently arresting the forward motion of the stock received on said conveyors, and means for adjusting the position of said arresting means in a direction longitudinally of the original direction of travel of the stock.

6. In combination a pair of vertically spaced main discharge conveyors for stock in the form of sheets cut to predetermined size, a pair of vertically spaced stock distributing units disposed in front of said discharge conveyors, said distributing units each having a series of endless belts disposed transversely to the direction of travel of the sheets discharged from said main conveyors, variable drive means for transmitting power from the upper main conveyor to the belts in the upper distributing unit to move the sheets thereon in one direction, variable drive means to transmit power from the lower main conveyor to the belts in the lower distributing unit to move the sheets thereon in a direction opposite to the movement of the sheets in the upper unit, said variable drive means being operative in each instance to vary the operative speed of a distributing unit relatively to that of its associated main conveyor, and means associated with each of said distributing units for arresting said sheets in their forward movement.

7. In an apparatus for handling and distributing stock in sheet form cut to predetermined lengths including a pair of conveyors for respectively conveying the cut sheets to a point of discharge, a pair of superposed sheet distributing units disposed in line with said conveyors, conveyors on said distributing units operating in directions transversely of said first mentioned conveyors and in opposite directions relatively to each other, and means carried by said distributing units to check forward motion of the sheets, said last named means comprising a back stop disposed transversely of each distributing unit, and a plurality of motion arresting elements carried by said back stop.

8. In an apparatus for handling and distributing stock in sheet form cut to predetermined lengths including a pair of main conveyors for respectively conveying the cut sheets to a point of discharge, a pair of superposed sheet distributing units disposed in line with said main conveyors, conveyors on said distributing units operating in directions transversely of said first mentioned main conveyors and in opposite directions relative to each other, means carried by said distributing units to check forward motion of the sheets, said last named means comprising a back stop disposed transversely of each distributing unit, a plurality of motion arresting elements carried by said back stop, a pinion rotatably mounted at each end of said back stop, a longitudinal rack disposed on each side of each distributing unit, said pinions being in engagement with said rack, and means for manually rotating said pinions.

9. In combination a main discharge conveyor for sheets pre-cut to predetermined size, a receiving table for receiving the sheets, transfer means for transferring said sheets from the discharge conveyor to the receiving table, said transfer means being operative to reduce the speed of said sheets as they are being deposited on the receiving table, and means for operating said transfer means at a speed lower than that of said discharge conveyor.

10. In combination a main discharge conveyor for sheets pre-cut to predetermined size, a receiving table for receiving the sheets, transfer means for transferring said sheets from the discharge conveyor to the receiving table, said transfer means being operative to reduce the speed of said sheets as they are being deposited on the receiving table, said transfer means being operable at one speed as it receives the sheet from the discharge conveyor and at a reduced speed as it deposits the sheet on the receiving table, and means for operating said transfer means at a speed lower than that of said discharge conveyor.

11. In an apparatus for handling and distributing stock in sheet form cut to predetermined lengths including conveyor means for delivering the sheets to a point of discharge, a receiving table for receiving the sheets, transfer means for transferring said sheets from the conveyor means to the receiving table, said transfer means being operative to reduce the speed of said sheets as they are being deposited on the receiving table, said transfer means comprising a pair of rolls and means including an overdrive device for driving said rolls, and means for operating said transfer means at a speed lower than that of said conveying means.

12. In an apparatus for handling and distributing stock in sheet form cut to predetermined lengths including conveyor means for the sheets, a receiving table for receiving the sheets, transfer means for transferring said sheets from the conveyor means to the receiving table, said transfer means being operative to reduce the speed of said sheets as they are being deposited on the receiving table, said receiving table having conveyor means thereon, said transfer means comprising a pair of rolls and means for transmitting power to said rolls from said conveyor means on the receiving table, and means for operating said transfer means at a speed lower than that of said conveying means.

13. In an apparatus for handling and distributing stock in sheet form cut to predetermined lengths including conveyor means for the sheets, a receiving table for receiving the sheets, transfer means for transferring said sheets from the conveyor means to the receiving table, said transfer means being operative to reduce the speed of said sheets as they are being deposited on the receiving table, said receiving table having conveyor means thereon, said transfer means comprising a pair of rolls and means for transmitting power to said rolls from said conveyor means on the receiving table, said last mentioned power transmitting means being effective to project a sheet through said rolls only after said sheet has been discharged from said first mentioned conveyor means, and means for operating said transfer means at a speed lower than that of said conveying means.

14. In an apparatus for handling and distributing stock delivered in sheet form from a main fabricating apparatus having a pair of stock discharge conveyors, a pair of stock take-off conveyors disposed in vertically spaced relation and respectively adapted to receive stock discharged from said stock discharge conveyors, said take-off conveyors being each operable to deliver the stock in a direction angularly related to the direction of its discharge from the stock discharge conveyors, and means for controlling the speeds of operation of said stock take-off conveyors in predeterminedly fixed timed relation to the operational speeds of said stock discharge conveyors respectively associated with said take-off conveyors.

CHARLES W. APGAR.

REFERENCES CITED

The following references are of record in the file of this patent:

UNITED STATES PATENTS

| Number | Name | Date |
| --- | --- | --- |
| 840,402 | Waite | Jan. 1, 1907 |
| 1,295,123 | Cheshire | Feb. 25, 1919 |
| 1,302,571 | McAdams | May 6, 1919 |
| 1,581,583 | Low | Apr. 20, 1926 |
| 1,628,292 | Wermes | May 10, 1927 |
| 1,831,245 | Hitchcock | Nov. 10, 1931 |
| 1,947,396 | Jaite | Feb. 13, 1934 |
| 2,024,013 | Sidebottom | Dec. 10, 1935 |
| 2,094,938 | Blatzheim | Oct. 5, 1937 |
| 2,142,011 | Spiess | Dec. 27, 1938 |
| 2,211,046 | Barber | Aug. 13, 1940 |
| 2,258,348 | Biggert | Oct. 7, 1941 |
| 2,283,255 | Holtz | May 19, 1942 |

FOREIGN PATENTS

| Number | Country | Date |
| --- | --- | --- |
| 155,305 | Great Britain | Dec. 23, 1920 |
| 428,032 | Great Britain | May 3, 1935 |
| 632,004 | Germany | July 1, 1936 |
| 458,955 | Great Britain | Dec. 30, 1936 |